O. E. HUNT.
BATTERY BOX.
APPLICATION FILED NOV. 17, 1917.
1,382,980.
Patented June 28, 1921.
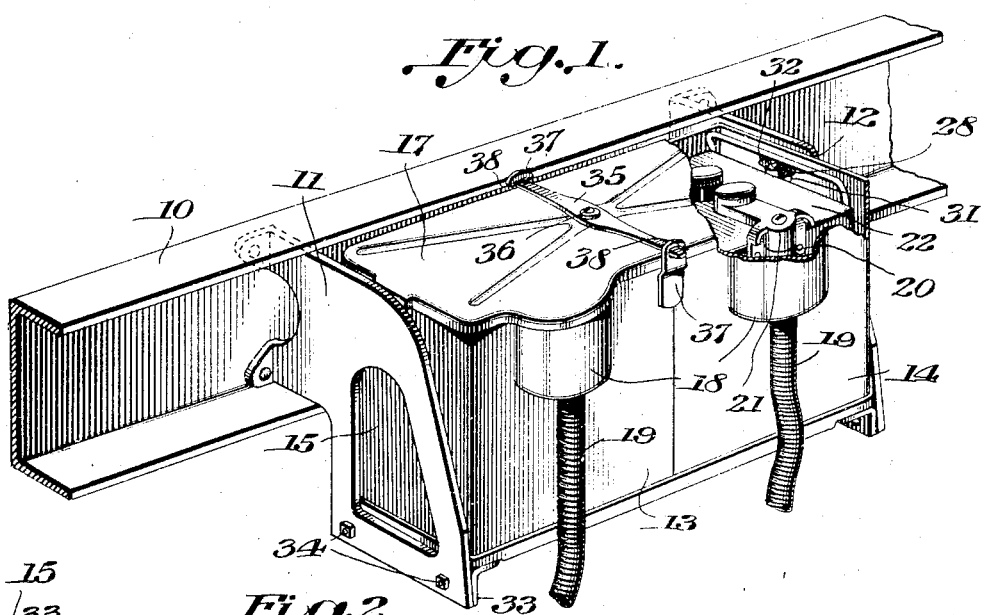
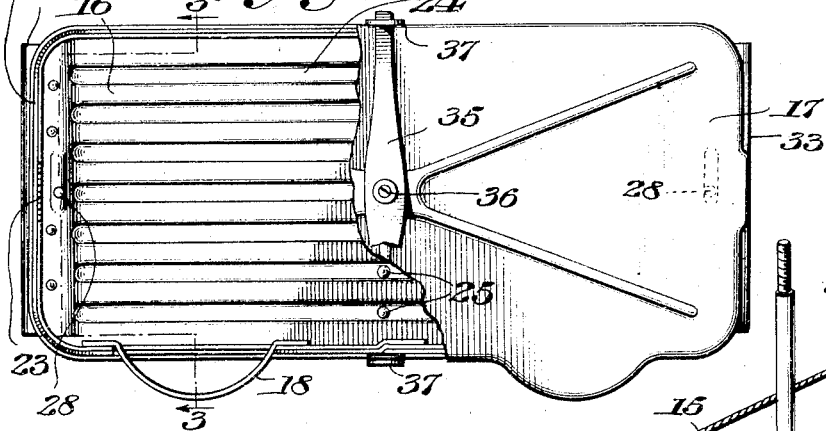
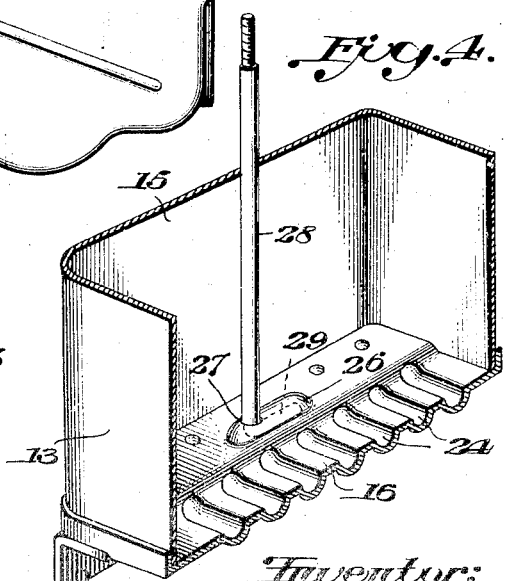
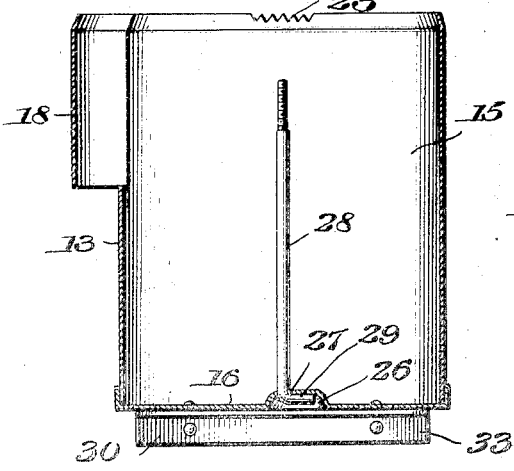
Inventor:
By Ormond E. Hunt;
Miller Sibbetts
Atty.

UNITED STATES PATENT OFFICE.

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

BATTERY-BOX.

1,382,980.   Specification of Letters Patent.   Patented June 28, 1921.

Application filed November 17, 1917. Serial No. 202,503.

*To all whom it may concern:*

Be it known that I, ORMOND E. HUNT, a citizen of the United States, and resident of Detroit, Wayne county, State of Michigan, have invented certain new and useful Improvements in Battery-Boxes, of which the following is a specification.

This invention relates to battery boxes and particularly to such boxes as used on motor vehicles.

The salient object of the invention is to provide a strong and rigid battery box adapted to the particular needs of motor vehicle use.

Other objects of the invention will appear from the following description taken in connection with the drawings which form a part of this specification, and in which:

Figure 1 is a perspective view of a battery box embodying this invention, shown as supported on the frame of a motor vehicle and having parts broken away to better illustrate the construction;

Fig. 2 is a plan view of the battery box shown in Fig. 1, the cover being broken away to illustrate the interior of the box;

Fig. 3 is a transverse vertical section on the line 3—3 of Fig. 2; and

Fig. 4 is a perspective and sectional view of a portion of one end of the battery box.

Referring to the drawings, 10 represents a portion of one of the side bars of a motor vehicle frame and 11 and 12 are two separated brackets secured to the side bar 10 and forming a support for a battery box 13. The battery box comprises side and end walls 14 and 15 respectively, a bottom 16, and a top or cover 17. One of the side walls 14 is formed near its upper edge with one or more outward bulges 18, two of such bulges being shown in the box illustrated in the drawings. These bulges are open at their lower ends to permit the entrance of cables 19 with terminals 20 for connection to terminals 21 on a battery 22 which is arranged in the box. The cover 17 extends over these bulges 18 as shown in the drawings.

At their upper edges the ends 15 are formed with several notches 23 to insure ventilation.

The bottom 16 of the box is formed with a series of channels 24 for the purpose of strengthening the bottom and of draining any liquid that may accumulate in the bottom of the box, outlet openings 25 being formed in the bottom of these channels.

At each end of the box the bottom is formed with an inward depression 26, shown as slightly elongated, and a hole 27 in this depression is provided for a battery securing rod 28 which has a bent end 29 resting in the depression 26. A strengthening plate 30 is secured along the end of the bottom covering the recess, thereby retaining the bent end 29 of the rod 28 therein. This construction is particularly shown in Figs. 3 and 4. This rod 28 extends upwardly and passes through an ear 31 on the battery 22 and a thumb nut 32 secures the battery firmly within the battery box.

The plate 30 above referred to is shown in the form of an angle-iron and the vertical flange 33 thereof is detachably secured as by the bolts 34 to the brackets 11 and 12 respectively, referred to above. Thus the battery box is arranged between the two brackets 11 and 12 and is detachably secured to them by this bolted connection.

The top 17 of the battery box is secured in place by a spring plate 35 which is pivoted at its center to the middle of the cover as at 36. A pair of ears 37 secured to the sides of the box are provided with bayonet slots 38 to receive the ends of the plate 35. In Figs. 1 and 2 the top is shown in secured position on top of the battery box and it will be understood that by slightly depressing the ends of the plate 35 the latter may be moved on its pivot 36 to disengage its ends from the ears 37, thereby releasing the top 17 so that it may be removed from the box.

It will be understood that my invention is not limited to the details of construction shown and other forms may be used without departing from the spirit or scope of the invention.

Having thus described my invention, what I claim and desire to secure by Letters Patent is:—

A battery box having a bottom formed with an inward depression and an opening in said depression, a battery securing rod extending through said opening and having a bent end in said depression and a plate angular in section secured to the bottom and covering said depression to retain the bent end of the rod therein, said plate also being secured to the battery box supporting bracket to support the box thereon.

In testimony whereof I affix my signature.

ORMOND E. HUNT.